US012639752B2

(12) United States Patent
Ward et al.

(10) Patent No.: US 12,639,752 B2
(45) Date of Patent: May 26, 2026

(54) MACHINE LEARNING MODEL CORRECTION

(71) Applicant: ZestFinance, Inc., Burbank, CA (US)

(72) Inventors: Geoffrey Michael Ward, La Canada Flintridge, CA (US); Sean Javad Kamkar, Burbank, CA (US); Jerome Louis Budzik, Burbank, CA (US)

(73) Assignee: ZestFinance, Inc., Burbank, CA (US)

( * ) Notice: Subject to any disclaimer, the term of this patent is extended or adjusted under 35 U.S.C. 154(b) by 0 days.

(21) Appl. No.: 18/365,117

(22) Filed: Aug. 3, 2023

(65) Prior Publication Data

US 2024/0046349 A1     Feb. 8, 2024

Related U.S. Application Data

(60) Provisional application No. 63/370,536, filed on Aug. 5, 2022.

(51) Int. Cl.
*G06Q 40/03* (2023.01)

(52) U.S. Cl.
CPC ................................... *G06Q 40/03* (2023.01)

(58) Field of Classification Search
None
See application file for complete search history.

(56) References Cited

U.S. PATENT DOCUMENTS

| | | | |
|---|---|---|---|
| 10,572,945 B1 * | 2/2020 | McNair ................... | G06Q 40/08 |
| 11,651,247 B2 * | 5/2023 | Golding ................... | G06N 5/04 |
| | | | 706/12 |

| | | | |
|---|---|---|---|
| 2006/0212386 A1 * | 9/2006 | Willey ................... | G06Q 40/02 |
| | | | 705/38 |
| 2019/0228006 A1 * | 7/2019 | Tormasov ................ | G06N 3/09 |
| 2022/0114399 A1 * | 4/2022 | Castiglione ............ | G06N 3/045 |
| 2022/0138621 A1 * | 5/2022 | Patil ...................... | G06N 3/084 |
| | | | 706/11 |

(Continued)

OTHER PUBLICATIONS

A machine learning approach for micro-credit scoring. (2021). Risks, 9(3), 50. doi:http://dx.doi.org/10.3390/risks9030050 (Year: 2021).*

(Continued)

*Primary Examiner* — Christopher Bridges
(74) *Attorney, Agent, or Firm* — TROUTMAN PEPPER LOCKE LLP; Christopher J. Forstner; Nicholas J. Gallo

(57) ABSTRACT

A method, in some implementations, may include obtaining output from a machine learning (ML) model responsive to input data, obtaining initial training data representing training data used to train the ML model, generating, based on the output from the ML model and the initial training data, correction training data that represents a desired alteration to the output from the ML model responsive to one or more particular subgroups in the input data, generating, based on the correction training data, a correction ML model configured to receive, as input, the input data and to output correction values which, when combined with the output from the ML model, perform the desired alteration, and generating corrected output as a combination of the output from the ML model and the output correction values from the correction ML model, and providing, for display, the corrected output.

21 Claims, 6 Drawing Sheets

(56)                    References Cited

U.S. PATENT DOCUMENTS

| | | | |
|---|---|---|---|
| 2023/0108599 A1* | 4/2023 | Zhang ............... | G06Q 30/0204 |
| | | | 705/35 |
| 2023/0169393 A1* | 6/2023 | Niu .......................... | G06N 5/01 |
| | | | 706/12 |
| 2023/0222378 A1* | 7/2023 | Romaniello ........... | G06Q 40/03 |
| | | | 706/12 |
| 2023/0229976 A1* | 7/2023 | Cheng .................... | G06N 3/084 |
| | | | 706/12 |

OTHER PUBLICATIONS

Nagpal, S. et al., "Diversity Blocks for De-biasing Classification Models," 2020 IEEE International Joint Conference on Biometrics (IJCB), IEEE, Sep. 28, 2020.

International Search Report and Written Opinion in related PCT Application No. PCT/US2023/071593, mailed Nov. 14, 2023.

Kozodoi, N. et al., "Fairness in credit scoring: Assessment, implementation and profit implications," European Journal of Operational Research, Elsevier, vol. 297(3), pp. 1083-1094.

International Preliminary Report on Patentability dated Feb. 20, 2025 issued in International Application No. PCT/US2023/071593.

* cited by examiner

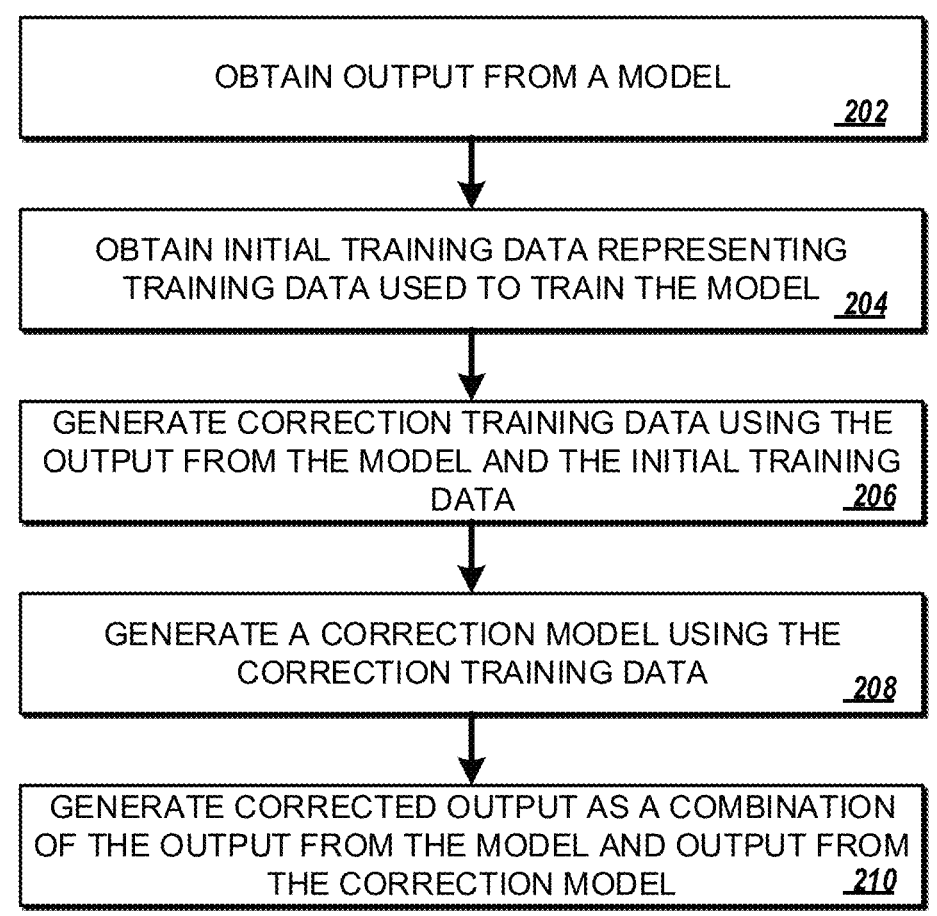

200

OBTAIN OUTPUT FROM A MODEL    202

OBTAIN INITIAL TRAINING DATA REPRESENTING
TRAINING DATA USED TO TRAIN THE MODEL    204

GENERATE CORRECTION TRAINING DATA USING THE
OUTPUT FROM THE MODEL AND THE INITIAL TRAINING
DATA    206

GENERATE A CORRECTION MODEL USING THE
CORRECTION TRAINING DATA    208

GENERATE CORRECTED OUTPUT AS A COMBINATION
OF THE OUTPUT FROM THE MODEL AND OUTPUT FROM
THE CORRECTION MODEL    210

FIG. 2

MACHINE LEARNING MODEL CORRECTION

CROSS-REFERENCE TO RELATED APPLICATIONS

This application claims priority to U.S. Provisional Patent Application No. 63/370,536, filed 5 Aug. 2022, the entire contents of which are fully incorporated herein by reference.

TECHNICAL FIELD

The disclosed systems and methods relate generally to machine learning modeling and training system improvements.

BACKGROUND

Machine learning models can be used in many fields, including fields where disparate impact among marginalized communities is undesirable for societal as well as legal reasons. United States laws, such as the Equal Credit Opportunity Act (ECOA) (codified at 15 U.S.C. § 1691 et seq.), enacted 28 Oct. 1974, incorporated by reference, provides a process to ensure fair credit decisions. This, and other laws, prevent machine learning modeling from being used in particular fields, such as credit risk modeling, where lenders legally must ensure that lending decisions are fair with respect to race and ethnicity, gender, age, and other protected attributes.

SUMMARY

Systems and processes disclosed herein enable new and useful methods for creating or improving machine learning models, e.g., models that can be used in fields with laws preventing disparate impact among groups, models that can be trained using training data that does not adequately represent a portion of constituents, among others. Methods described herein provide more fair models. More fair models can include models that are corrected to reduce disparate impact on one or more constituents in training or input data. In applications of lending, corrected models can have less of a disparate impact on marginalized communities compared to uncorrected credit lending models. Corrected models can be compliant with one or more laws and regulations, such as ECOA, among others.

In some implementations, methods described herein improve the accuracy of model output. For example, model accuracy can suffer from inadequate training data or training data that overemphasizes some elements which, in turn, skews output of the model. Correction techniques described herein can be used to improve accuracy of models by sampling for discrepancies in the model output and learning adjustments using model training data, or data representative of model training data, to apply adjustments to output of a given model.

In some implementations, methods described herein improve the efficiency of model operation or generation. For example, instead of regenerating a model, e.g., a predictive model, to correct for inaccuracies (e.g., race based preference, chemical compound bias, among others), a correction model can be generated. The correction model can be generated more quickly than retraining an original model and, as shown in the figures and descriptions of this disclosure, can result in more accurate output.

BRIEF DESCRIPTION OF THE DRAWINGS

FIG. 2 is a flow diagram illustrating an example of a process for machine learning model correction.

Like reference numbers and designations in the various drawings indicate like elements.

DETAILED DESCRIPTION

In determining whether to deploy a model (e.g., a predictive model) in a real-world scenario that impacts people's lives, fairness in how such a model impacts people's lives can be a consideration in determining whether to deploy the model, or continue model development. For example, whether a model favors a certain class of people (e.g., a class based on race, ethnicity, age, sex, national origin, sexual orientation, demographics, military status, etc.) over other classes of people may be a consideration in determining whether to deploy the model.

Fairness can also be a concern in deciding whether to deploy models that do not directly impact people's lives, or that do not affect people's lives at all. For example, for a predictive model that predicts a value related to the efficacy of various drugs, it might be desired to have a model that does not favor drugs produced by a specific manufacturer. Other examples exist in which it is useful to have a model that is fair with respect to a certain class of outcomes and attributes.

Similarly, in many cases, it is desirable to have a model that produces predictions that result in similar outcomes for a plurality of segments identified based on a sensitive attribute. Embodiments herein can address the foregoing by providing new and useful systems and methods of correcting machine learning models for fairness, a problem which is rooted in machine learning and methods which predict outcomes based on data related to prior examples.

In some implementations, a method disclosed herein functions to generate a prediction system that outputs one or more predictions based on received data (sometimes called predictive variables, model features, or independent variables), in a manner that produces similar outcomes with respect to different sensitive attributes. A method disclosed herein can enable model developers to correct a model for fairness by training a secondary correction model, such as correction model 106 shown in FIG. 1, that modifies an original model's score or other output to make model-based outcomes more fair with respect to sensitive attributes.

Figure 1:
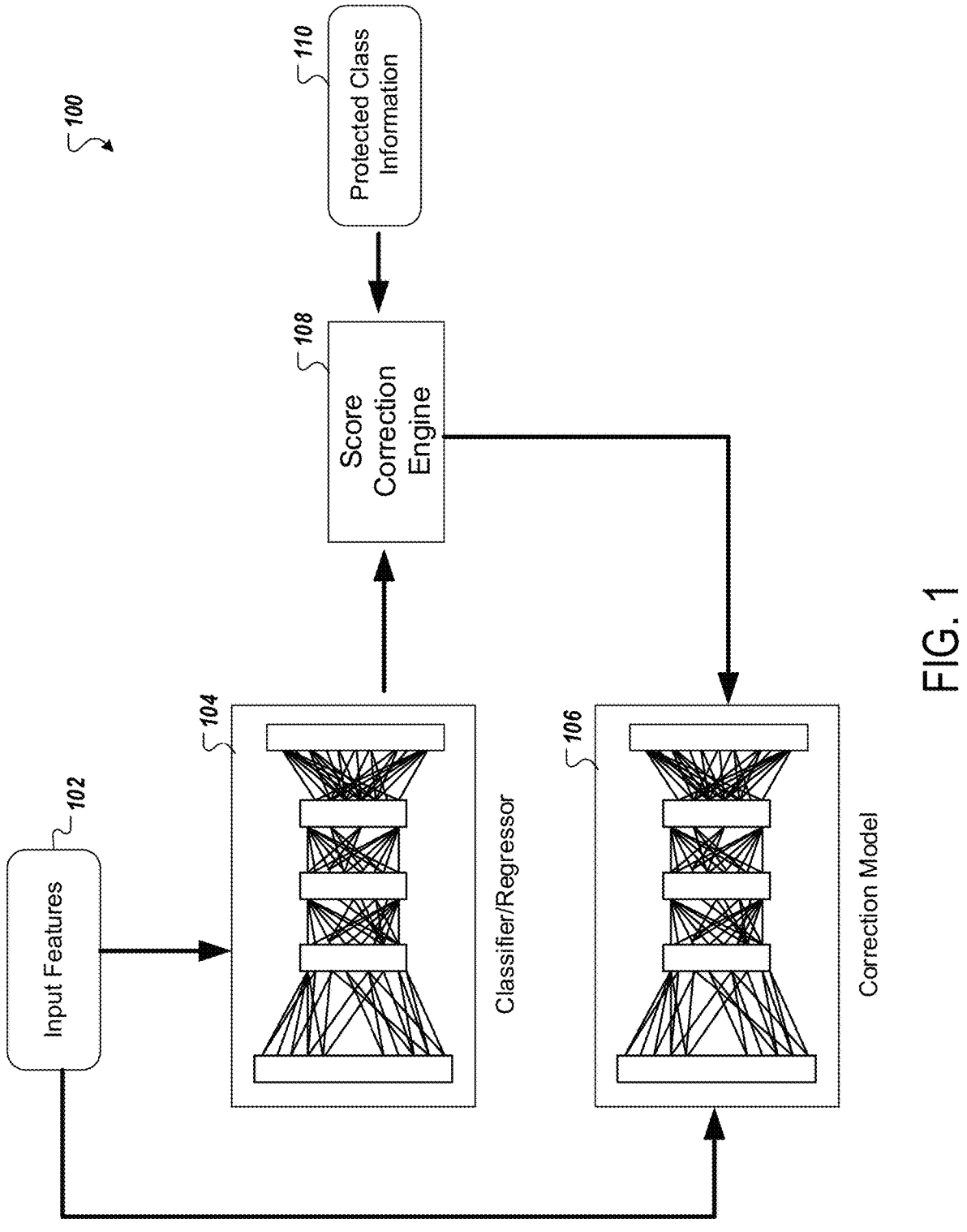
FIG. 1 is a diagram showing an example of a system for machine learning model correction.

In some implementations, a correction model is combined with an existing model to achieve fairer outcomes from the combined system of models without modifying the original model, e.g., model 104 shown in FIG. 1. Such a method is desirable when it is not possible to modify the original model, for example, when the model is proprietary, for example, when the model is a black box model provided by a vendor, such as FICO® or VantageScore®, or when the model is a complex system that is difficult to modify. In some implementations, correction approaches described herein are applied to black box models to improve the fairness of outcomes.

FIG. 1 is a diagram showing an example of a system 100 for machine learning model correction. The system 100 includes a model 104, a correction model 106, and a score correction engine 108. The correction model 106 applies a correction to the output of the model 104. In some implementations, the model 104 is a classifier or a regression model. The system 100 can be implemented by one or more computers or one or more processors operating on one or more computers, as described herein. The model 104 or the correction model 106 can include one or more fully or partially connected layers of one or more nodes representing one or more weights or parameter values. The model 104 and the correction model 106 can be any suitable type of machine learning model. Graphical representations of connected layers are shown for both the model 104 and the correction model 106 in FIG. 1.

The system 100 generates correction training data using the score correction engine 108. The correction model 106 is trained using the correction training data to generate corrections to the output of the model 104 to make the output of the model 104 more fair. In some implementations, more fair includes having less disparate impact on protected versus unprotected groups. In some implementations, more fair includes improved accuracy by compensating for training data that under represents one or more constituent groups or elements of the training data. For example, loan data can include more data one particular class of citizens earning a median income compared to another different class who are economically distressed. In this way, the predictive nature of the model 104, if used to predict loans, may be less accurate for the second class of citizens compared to first class of citizens. In some implementations, the correction model 106 reduces this potential error.

The model 104 and the correction model 106 both obtain input features 102. The input features 102 can be training data for the model 104. The input features 102 can be representative of training data for the model 104 but not actual training data used to train the model 104.

The model 104 generates output using the input features 102. The input features can include lending data (e.g., biographic, economic information, for one or more persons), scientific data (e.g., drug testing data, weather data), among others. In some implementations, the model 104 is trained to determine scores using the input features 102. For example, the model 104 can be trained to generate a representative score indicating credit worthiness for lending for one or more persons. The one or more persons can include one or more persons in a protected or non-protected class.

In some implementations, scores generated by the model 104 are represented by graphs or charts, e.g., graph 302, 306 or chart 310. The model 104 provides generated scores to the score correction engine 108. The score correction engine 108 obtains protected class information 110. In some implementations, the system 100 obtains the protected class information 110 using one or more algorithms. For example, the system 100 can determine the protected class information 110, indicating a protected class corresponding to one or more persons or elements represented in the input feature 102, using Bayesian Improved Surname Geocoding method (BISG), Zest Race Predictor method (ZRP), among other techniques.

The score correction engine 108 obtains output from the model 104 and generates target output data for the correction model 106. The system 100 can train the correction model 106, using one or more processors, to generate data corresponding to the target output data generated by the score correction engine 108 for input data corresponding to the input features 102. In some implementations, the score correction engine 108 generates differences between percentile groupings of subsets of constituents represented in the input features 102. For example, the score correction engine 108 can group output of the model 104 using the protected class information 110. For lending data indicating persons, the protected class information 110 can include race, ethnicity, religious beliefs, among others. For other applications, the protected class information 110 can include data indicating an element of the input features 102 is classified under one or more sub-groupings. In some implementations, the correction model 106 is a forest that includes one or more tree models. For example, one or more trees can be added for each iteration of training by the system 100.

Figure 3:
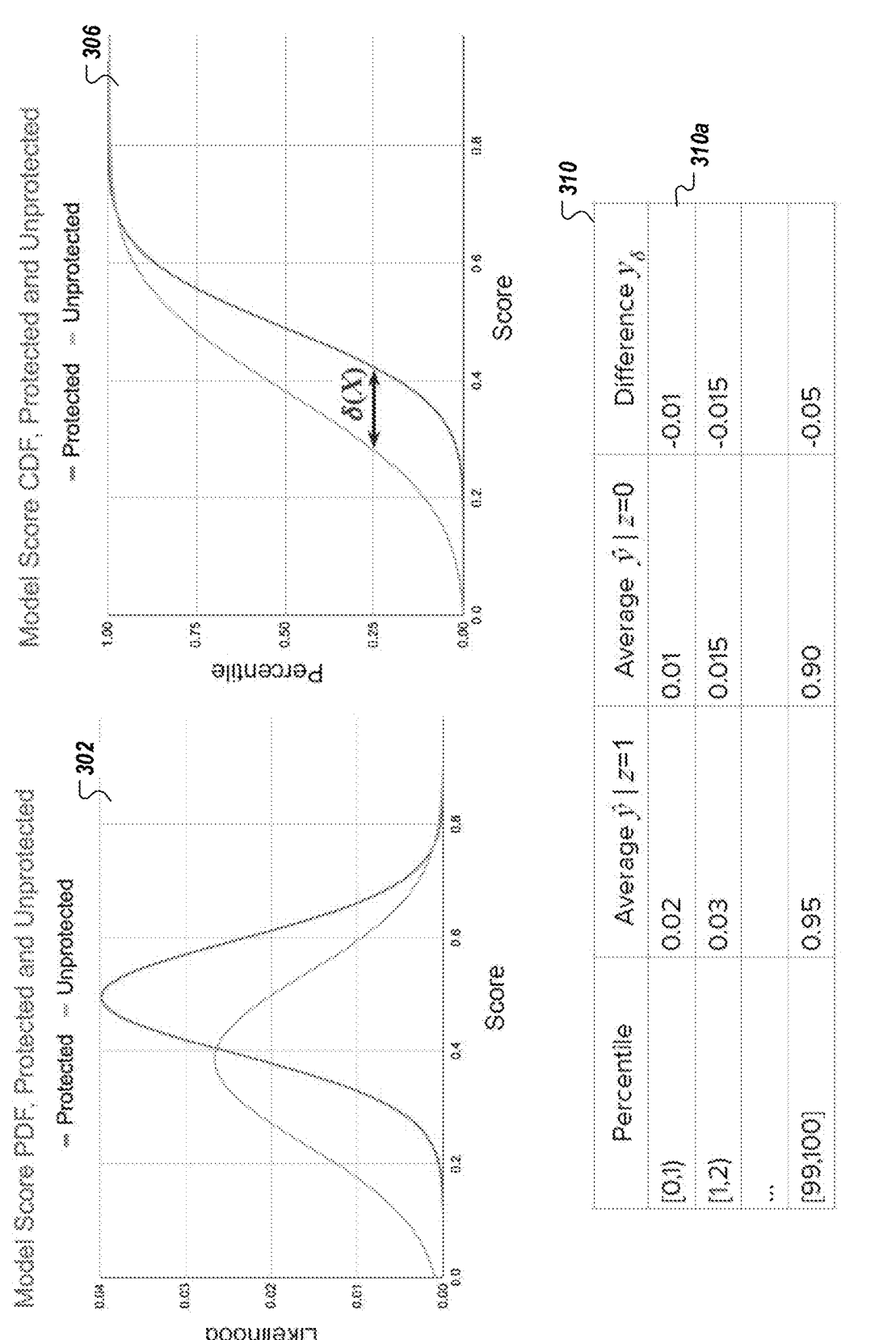
FIG. 3 is a diagram showing an example of generating discrepancies between protected and unprotected groups to generate training data for a correction model.

Row 310a in in FIG. 3 shows average output values for group z=1 (e.g., protected class) and group z=0 (e.g., unprotected class), the corresponding percentile (e.g., [0,1)), and a difference value, $y_\delta$. The score correction engine 108 can generate a similar data structure storing the data between groups identified by the protected class information 110 in output from the model 104. In some implementations, for one or more other subgroupings, the score correction engine 108 can score. One or more correction models can be generated to correct the model 104 for specific disparities between two or more groups. The disparities can be determined by the score correction engine 108 using difference in score values, comparison of group error distributions, among other suitable methods.

The score correction engine 108 provides score correction data to the correction model 106. The system 100, including one or more processors configured to train the correction model 106, can provide the input features 102 and compare output of the correction model 106 with the score correction data generated by the score correction engine 108. By comparing the output of the correction model 106 with the score correction data generated by the score correction engine 108, the system 100 can generate an error term. The system 100 can use the error term to train the correction model 106 to reduce an error term generated in one or more successive input features.

In some implementations, the correction model 106 is represented as $\delta(x)$, as described herein, where x represents input features, such as the input features 102, and $\delta(x)$ equals a correction to apply for scores generated by the model 104. In some implementations, $\delta(x)$ equals a correction to apply for scores for particular percentile scores. For example, after training the correction model 106, the correction model 106 can apply a correction in proportion to $\delta(x)$ to output of the model. For example, the output of the model 104 and a trained version of the correction model 106 can be represented by the equation: $P_{fair}(y=0|X)=(1-\lambda)\ P(y=0|X)+\lambda\delta(X)$. $\lambda$ can be used as a parameter, e.g., provided by a user, to control the extent to which a fairness correction is applied.

FIG. 2 is a flow diagram illustrating an example of a process 200 for machine learning model correction. The process 200 may be performed by one or more electronic systems, for example, the system 100 of FIG. 1 or computing device 500 or mobile computing device 550 of FIG. 5.

The process 200 includes obtaining output from a model (202). For example, the system 100 (e.g., one or more computer processors implementing the system 100), can obtain output from the model 104. The output can include one or more scores, such as scores indicating credit worthiness.

The process 200 includes obtaining initial training data representing training data used to train the model (204). For example, the system 100 can obtain the input features 102 as initial training data that is representative of, or is the actual, data used to train the model 104. By separating the correction model 106 from the model 104, the methods and techniques described herein can increase efficiency for generating fair versions of preexisting models, such as black box models, legacy models, or models that cannot be readily changed.

The process 200 includes generating correction training data using the output from the model and the initial training data (206). For example, the system 100 can obtain correction training data from the score correction engine 108. The correction training data can include one or more difference values for one or more subgroups represented in the input features 102 using values generated by the model 104 from the input features 102 used as input.

The process 200 includes generating a correction model using the correction training data (208). For example, the system 100 can generate the correction model 106. The system 100 can use the input features 102 as input to an untrained model (or partially trained) and compare the output of the untrained model to correction training data ground truths (e.g., data generated by the score correction engine 108 indicating difference values for one or more elements of the input features 102). Based on comparing the output of the untrained model to correction training data ground truths, the system 100 can adjust one or more weights or parameters of the untrained model to generate the correction model 106 as a trained version of the initial untrained model.

The process 200 includes generating corrected output as a combination of the output from the model and output from the correction model (210). For example, the system 100, or another system, can use the correction model 106 with the model 104 to generate corrected output. The system 100 can use one or more combination techniques, e.g., linear combination, linear weighted combination, among others, to combine the output of the model 104 with output of the correction model 106. The combination of the output of the model 104 with output of the correction model 106 can be used as output of a corrected model.

In some implementations, in operation after generation of a correction model, a method includes: obtaining output from a model and generating corrected output as a combination of the output from the model and output from the correction model. For example, the correction model can be generated one time and used to correct output from a model many times. The correction model can be adjusted. In some implementations, the correction model is a forest model. For example, the correction model can be adjusted by adding a tree configured to provide a correction value for a particular set of input values. A method disclosed herein can result in fairer outcomes with respect to sensitive attributes without including the sensitive attribute as an input to the model. Such an approach is desirable when model developers are prohibited from including a sensitive attribute as a model input variable, but seek to improve outcomes from decisions made based on a model's prediction with respect to a sensitive attribute. For example, in the United States, it is prohibited for lenders to consider protected class membership status when deciding whether to grant a loan to a consumer, but the law compels lenders to seek less discriminatory alternatives that provide greater demographic parity with respect to outcomes across protected and non-protected classes, e.g., female and male credit applicants. It will be recognized by practitioners with ordinary skill in the art that a method disclosed herein can be used to optimize the fairness of outcomes to ensure greater demographic parity, more equal opportunity, or more equalized odds.

Fairness of a prediction system can be identified based on a measured difference in outcomes for decisions based on the model for each value of a sensitive attribute. For example, if a prediction system is designed to predict the probability of default for a consumer loan, a fair model can generate output (approval rate for loans, for example) that is similar for each race and ethnicity (or other sensitive attribute such as age, color, disability, gender, gender expression, gender identity, genetic information, national origin, race, religion, sex, sexual orientation, marital status, or veteran status) of a credit applicant. Output can include an approve/deny decision and an approval rate. Output, also referred to as outcomes, can include loan terms (APR, down payment amount required) or any suitable or measurable outcome.

For fair models, such as predictive models corrected by a correction model (e.g., shown in FIG. 1), default predictions generated by a prediction system can be invariant to race/ethnicity (or at least satisfying a threshold value for a metric that identifies the impact of race to credit scores generated by the prediction system). Fairness of outcomes can be measured by comparing the distributions of outputs generated by a model for datasets with protected attributes with outputs generated by a model for datasets without protected attributes. Model outcomes can be similar, e.g., when the distribution of model outputs are similar between protected and unprotected datasets (as measured by, e.g., the max Kolmogorov-Smirnov (K-S) statistic, the Wasserstein metric, the standardized mean difference (SMD) statistic, or other suitable metrics). In other cases, when the model is used for binary decision-making, such as approve/deny decisions for credit applicants, the fairness of outcomes may be measured using Adverse Impact Ratio (AIR) statistics, e.g., the ratio of approval rate for the protected group compared to the approval rate for their unprotected counterparts. In many cases, a model developer seeks to explore model variations that maximize one or more outcomes (e.g., predictive accuracy of the model, parity of outcomes with respect to sensitive attributes, among others). The embodiments disclosed herein can provide model developers with a practical method for generating models that maximize one or more outcomes, such that optimal tradeoffs between the outcomes can be identified (e.g., maximizing fairness and accuracy), resulting in an efficient frontier of model alternatives.

In some implementations, protected class membership status of an applicant is estimated based on the Bayesian Improved Surname Geocoding method (BISG) and used to train a correction model. In some implementations, protected class membership status is estimated based on the Zest Race Predictor method (ZRP) and appended to data used to train a correction model, such as the correction model 106.

In some implementations, protected class membership status is self-reported by the consumer and appended to the development data used to train a correction model. In some implementations, demographic information associated with a consumer is stored in a distributed ledger or decentralized database. In some implementations, demographic information associated with a consumer is retrieved from a social media site and is based on analysis of social media content.

When the distribution of predictive outputs for a prediction system is different between datasets with and without sensitive attributes, then the prediction system most likely fails to satisfy fairness constraints defined for the prediction system. If values for a sensitive attribute (e.g., the borrower's race and ethnicity, age, gender, etc.) can be predicted by a second model based solely on the outputs from the prediction system, this implies that the outputs of the prediction are not fair, e.g., the system preferentially favors applicants with certain sensitive attributes over others. Preferential favoring can include males over females, whites over African Americans, among others. Even if values for these sensitive attributes are not provided to the prediction system as inputs, the outputs of the prediction system may still be correlated with specific sensitive attributes.

Since outputs of a prediction system can be used to provide benefits or opportunities to users of such systems, this correlation can cause harm to members of those sensitive groups. For example, if a credit model scores most African American applicants as more likely to default on their loan than White, Non-Hispanic applicants, this will be reflected in the difference in the distribution of scores for African Americans and White, Non-Hispanic applicants. As a result of the difference in distribution, African Americans may be approved less frequently than White, Non-Hispanic applicants, by a credit policy that relies on the score. However, if there is no difference in the distribution of scores with respect to sensitive attributes, or the difference satisfies a threshold difference, a prediction system can be deemed to be fair with respect to the sensitive attribute. This fairness can be quantified with a measurement, e.g., through distribution comparison metrics such as SMD, Wasserstein, max K-S, and the like.

In some implementations, a method for fairness correction of models includes: receiving a dataset and scores from an original predictive model associated with the dataset corresponding to the scores; determining the presence or absence of at least one sensitive attribute for each row in the dataset; training a secondary correction model (e.g., a tree-based predictive model) using the presence or absence of the sensitive attribute and the scores from the original predictive model; generating at least one score using a combination of a score from the original predictive model and the learned correction model; providing the score to a user or computer element configured to make a decision using the score.

In some implementations, a method for fairness correction of models includes generating a correction model using a difference in score between similar non-protected and protected applicants. For example, first, the method can include grouping scores from an original model based on the presence or absence of a sensitive attribute. The method can include sorting the scores within each group, e.g., in descending value or other sorting method. The method can include determining an average score by percentile for each group. The method can include determining a difference in score by percentile. A graphical representation of an example of this method is shown in FIG. 3. The method can be illustrated as follows:

Create a discrete representation of the regression target $y_\delta = \delta(X)$ where $\delta$ is the correction model and X is a dataset For each training data row x in X find the protected status $z$ of x For each $\hat{y} = P(x)$, the score generated by the original model corresponding to x, compute the percentile of $\hat{y} | z$ Compute the average score for each percentile and the difference, e.g., shown in Table 1:

TABLE 1

| Percentile | Average $\hat{y}$ \| z = 1 | Average $\hat{y}$ \| z = 0 | Difference y$\delta$ |
|---|---|---|---|
| [0,1) | 0.02 | 0.01 | −0.01 |
| [1,2) | 0.03 | 0.015 | −0.015 |
| . . . | | | |
| [99,100] | 0.95 | 0.90 | −0.05 |

Assign a target for the correction model $\delta(X)$ for each row of training data as follows: For each row x in X, given $z$, let the target $y_\delta$ of the correction model $\delta(X)$ be the difference corresponding to the entry for the percentile of $P(y=0|x, z)$.

The aforementioned steps can be used to create a training dataset for the correction model $\delta$.

In some implementations, the $y_\delta$ is the simple difference. In other implementations $y_\delta$ is the midpoint (e.g., the difference divided by 2). In some implementations, $\delta(X)$ is trained on the basis of all rows. In some implementations, $\delta(X)$ is trained only on protected status rows. In some implementations, the sign of $y_\delta$ is determined based on the protected status, e.g., if the target represents the likelihood of default, in some implementations, the sign of $y_\delta$ is set so that it is negative or always negative (indicating the protected borrower will always be helped).

A simplified example shown in Table 1 and item 310 in FIG. 3 considers the protected attribute $z$, which can take the value of either 0 or 1, based on whether the applicant is a member of a protected group or not. However, additional protected statuses, or different protected statuses can be incorporated, e.g., corresponding to male vs protected gender, white non-Hispanic vs protected race/ethnicity, <65 years old vs >=65 years old, or any other attribute.

The target computed in Table 1 and item 310 correspond to a difference in score by percentile which is used to determine a correction required to make distributions of scores by attribute more similar. In some implementations, differences are computed for a plurality of protected attributes. The differences can be combined based on a weighted average by population to determine a single correction target value. It will be appreciated by one skilled in the art that while the difference in score by percentile allows for creation of a correction model, such as the correction model 106, that achieves greater demographic parity, other regression targets corresponding to other fairness outcomes (e.g., equalized odds, equal opportunity) can be computed to achieve these other fairness outcomes. In some implementations, a correction model is learned for each protected basis. A correction model score can be combined using an average, weighted average, or based on a correction model score with a maximum absolute value, to compute a final model score.

In some implementations, once the training data for the correction model is determined, a method includes training the correction model $\delta$, such as the correction model 106, based on this training data. In some implementations, a correction model is a regression model trained using gradient boosting using predictors X on the target $y_\delta$ described herein. In some implementations, a correction model is a gradient boosted decision tree regressor. In some implementations, a correction model is an XGBoost model or lightgbm model. In some implementations, a correction model is a linear regression model, a neural network, deep neural network, extra tree forest, radial basis function, CatBoost regressor, TabNet regressor, or other predictive model. A correction model can predict how much a score, e.g., $\hat{y}=P(x)$, must be corrected for each x in X to make the outcome more fair for that specific x.

In some implementations, correction model $\delta(X)$ is combined with an original model using a linear combination to generate corrected scores. In some implementations, a fair ensemble, such as output of system 100 shown in FIG. 1, is given by $P_{fair}(y=0|X)=(1-\lambda)\,P(y=0|X)+\lambda\delta(X)$ where $\lambda$ is a parameter provided by the operator to control the extent to which the fairness correction is applied. In this way, a user of the model can generate a series of alternative models that each make a different trade-off between predictive accuracy and a fairness metric.

In some implementations, a method of combining a correction model and an original model is a linear combination as described herein. In some implementations, a method of combining a correction model and an original model includes another algorithm or process such as an average or other function. In some implementations, a correction model is a regression model trained using gradient boosting. In some implementations, a correction model is an XGBoost regressor. In some implementations, a correction model is a lightgbm model, a linear regression model, a random forest, a decision tree regressor, a deep neural network or other suitable regression modeling method that can estimate the correction function required to achieve improvements in fairness based on data.

In some implementations, an original model and a correction model are trained simultaneously, e.g., after each training epoch of an original model, the process described herein can be executed, and a correction model can be added to the ensemble. Loss can be computed using the ensemble prior to proceeding to the next training epoch, in which additional trees are grown and an additional correction model is estimated and added. Training proceeds until a stopping criterion is reached using a linear combination of models, resulting in an ensemble of trees that includes a series of estimators from the original learning algorithm and a series of correction models computed at each iteration of the training process. In this way, a more incremental approach to training the correction model can be taken.

In some implementations, an original predictive model is an underwriting model, or probability of default model, which is often used to assess whether an applicant for an unsecured loan, secured loan, small business loan, construction loan, equipment loan, lease, by-now-pay-later loan, installment loan, vehicle loan, credit card, student loan, small business loan, mortgage loan, and the like will meet their payment obligations. In some implementations, a predictive model is a classification model such as a model that predicts a likelihood a person or entity will: (a) default after a loan or credit facility has already been granted (b) cure a delinquency (c) prepay a mortgage (d) respond to an advertisement or other solicitation (e) accept an offer (f) succeed at a job (g) meet obligations under a rental agreement (h) churn or cancel a subscription (i) commit a crime (j) graduate a degree program (k) pass a class. A method disclosed herein works with any classification model for which information is available to train the correction model.

In some implementations, model development data for an original model, such as the model 104, is readily available. In this case, the model development data (training data) is used to train the correction model $\delta$, e.g., the correction model 106, as described herein. In some implementations, an underwriting model is a black box model such as a FICO® score, LexisNexis® Risk View™ score, VantageScore®, or other risk score, for which the original training data, and features used to train the model are not available. In some implementations, the black box (FICO® or other) scores for a sample of known people are available. These scores are built based in part on data from Credit Bureaus (e.g., in the United States, Equifax, Experian, or TransUnion). As such, in some implementations, a method includes first receiving personal data about a number of people, their credit scores from a black box model, and retrieving credit bureau data from a credit bureau, including tradeline data, inquiries, collections and public records. Next, the credit bureau data is transformed into predictive attributes or features, in some implementations based on methods described in U.S. Pat. No. 11,106,705 and U.S. patent application Ser. No. 17/104,616; and 63/364,089, the contents of which are incorporated herein by reference in their entirety. The computed attributes are included in the training data for $\delta$ which is trained as described in the procedure above. In this way, a correction model $\delta$ can be trained to correct the model so businesses can still use the model while ensuring less race and gender discrimination or other negative outcomes for other protected groups based on their use of the black box model.

In some implementations, an original model, such as the model 104, is a regression model, which predicts a quantity e.g., versus a likelihood as is the case for an underwriting model. The original model can be a valuation model, a house price estimation model, a business valuation model, a sales forecasting model, a utilization model such as a service utilization model, an occupancy model, a highway traffic model, a power usage model for a building, US Census block group, ZIP Code®, or county, a public transit usage model, a voter turnout model, an internet service traffic forecasting model, a retail traffic forecasting model, an emissions model, a disease transmission rate model, a treatment compliance model, a population growth model, a defect rate model, an energy output model, a production output model, a power output model, a demand forecasting model, a cost model for an insured, a cost model for a health care plan member, a cost model for a government service, a cost model for a benefit holder, or other model which predicts a quantity such as a valuation, usage, revenue or cost model, without limitation. In some implementations, e.g., where an original model is a regression model, a target for $\delta$ is the difference in predictive value based on the cumulative mean squared error of the regression prediction between protected and unprotected predictions.

In some implementations, e.g., where an original model is a regression model, a method includes first receiving a dataset including rows of predictive attributes, a predicted value from the original model associated with each row, and an actual value associated with each row. Methods, and others referred to herein, can be performed by one or more computers, such as a computer described in reference to FIG. 5. The square of the difference in predicted and actual value can be computed per row and appended to each row.

A dataset can be sorted from lowest to highest squared difference. The average predicted value grouped by protected status for the first percent of rows by count can be computed and a correction target $y_\delta$ for the first percentile by squared error can be the difference between protected and unprotected predicted values. The correction target value is recorded in a lookup table similar to Table 1 and item 301. The method proceeds to the next 1% of rows, to build a lookup table for y. The method proceeds as described herein where each row in the training data receives a target $y_\delta$ based on the lookup table and the percentile of the squared error of the prediction of the original model. The correction model $\delta$ can be trained based on this new definition of $y_\delta$ which can be based on the difference in protected and unprotected predictions associated with the original model indexed by percentile of squared error. In this way, the method may be applied to address bias in the error of regression models, in order to make valuation, usage, revenue, or cost models more fair for protected groups, or, more generally, for sensitive attributes for which it is desired to have parity in the error for predictions between those with and without the sensitive attribute.

In some implementations, an original regression model is a model where development data is available, such as a valuation model developed in house at a financial institution. In these cases, steps described herein can be applied to calculate a target. In some implementations, an original regression model is a pre-existing model or a vendor model where development data is unavailable. The correction model can be trained based on data used to score the original regression model, the original regression model's predicted value, and an actual value. In this way, vendor models, or pre-existing models for which development data is not available may easily be corrected to have more demographic parity with respect to the error of the predictions generated by these models. In some implementations, an original regression model is a collection of models or an ensemble of models, each model used to predict a value based on different attributes, e.g., based on a geographic region or segment.

In some implementations, a correction model is trained based on the output of all the models in a collection or ensemble. In this way a complex system of models can be corrected, without training a correction model for each model in the ensemble or collection.

In some implementations, a method includes generating at least one explanation for a corrected model based on a decomposition and attribution methods described in U.S. patent application Ser. Nos. 16/297,099; 16/434,731; 16/688,789; and 63/046,977, the contents of which are incorporated herein by reference in their entirety. Shapley values can be computed for a correction model $\delta$ and combined with attributions for the original model according to a function used to combine scores (e.g., $(1-\lambda)$ $(P(y=0|X))+\lambda\phi(\delta(X))$ where $\phi(P)$ and $\phi(\delta)$ are the vectors of average differential Shapley values of $P$ and $\delta$ for each feature in a feature vector x representing an applicant with respect to a reference population of e.g., approved borrowers).

For example, if a Shapley value associated with a correction model and an input variable income is 0.2, and the Shapley value associated with an original model and the input variable income is 0.4, and the linear combination weights the correction model at $\frac{1}{2}$ and the original model at $\frac{1}{2}$, the combined importance of income would be $0.2/2+0.4/2=0.3$. In some implementations, a reference population is selected based on historically approved borrowers or the lowest likelihood of default as assessed by the original model.

In some implementations, a number of references used to compute the differential Shapley values (P) and ($\delta$) is determined based on a Monte Carlo sampling and the Student's t distribution. In some implementations, Shapley values (P) and $\phi(\delta)$ are calculated using a model-specific algorithm such as TreeSHAP, interventional SHAP, Integrated Gradients, or a more general method such as Generalized Integrated Gradients. Shapley values can be combined according to a linear combination, and then grouped into categories or higher-level reasons. In consumer finance applications, it can be useful to provide higher-level reasons for the denial that represent reasons a consumer can understand.

After grouping the Shapley values by category or higher-level reason the values assigned to the same category/reason are summed. The categories/reasons with the largest sum of Shapley values are provided to the consumer so they can understand why they were denied. More detailed descriptions of the adverse action method and additional examples are provided in the patent applications cited herein, which consider explanations for ensemble models, including linear and non-linear ensembles. By providing adverse action reasons for a corrected model in this way, the presently disclosed methods allow lenders to comply with the Equal Credit Opportunity Act Regulation B and the Fair Credit Reporting Act which require lenders to provide notices of adverse action that state the principal reasons for denial of credit or other decision that adversely impacts a consumer.

In some implementations, a combined model is documented in accordance with Federal Reserve Letter SR 11-7/Office of the Comptroller of the Currency Letter 2011-12, the interagency supervisory guidance on model risk management (Supervisory Guidance on Model Risk Management (2011) https://www.federalreserve.gov/supervisionreg/srletters/sr1107a1.pdf). Model documentation can include feature importance, partial dependence plots, and attribution plots, which are computed using Shapley values calculated based on the combined Shapley values of an original model and a correction model. The model documentation may be generated automatically using methods such as those described in U.S. patent application Ser. No. 16/394,651, the contents of which are incorporated herein by reference in their entirety.

In some implementations, Shapley values (P) are not available directly, instead only a small number of adverse action reasons associated with the model P are available. In this case, the correction model may introduce new variables and new reasons that would result in different reasons or a different ordering of reasons provided for the denial or other adverse action. To accommodate this case, the Shapley values (P) can be estimated through a sampling process which replaces values in the input data and observes the returned adverse action reasons based on the original model P. Likewise, the distribution of reason codes can be observed and Shapley values assigned based on properties of the distribution. Any suitable estimation method may be used.

In some implementations, Shapley values associated with adverse action reasons returned for scores generated by P are estimated using a Pareto distribution, and the Shapley values associated with each adverse action reason is assigned based on the rank order of the reason. In some implementations, a more transparent model is built to proxy or simulate an original model and the Shapley values associated with the proxy model are explained. These estimated Shapley values associated with the original model can be combined with reason codes generated based on Shapley values of $\delta$ to determine the final list of reasons for a corrected model. In this way, even black box credit scoring models can be corrected and explained, so lenders who use the corrected models can still comply with the Equal Credit Opportunity Act and the Fair Credit Reporting Act Reg B.

In some implementations, a method includes generating at least one report describing the original model and its predictive performance and fairness metrics, as described in U.S. Pat. No. 10,977,729, and U.S. Patent Application No. 63/117,696 both of which are incorporated herein by reference in their entirety. In some implementations, generating a report includes generating one or more features shown in the example report (e.g., "Fair Lending Report") of the appendix. In some implementations, the report also shows predictive performance and fairness metrics disaggregated by protected class membership status. In some implementations, the report includes analysis that provides predictive performance statistics and fairness metrics on various model alternatives generated based on different values of λ in the linear combination described herein. In some implementations, the report computes a confidence interval associated with the pointwise estimate of predictive performance for the most accurate, uncorrected model, based on bootstrap sampling and the application of the Student's t distribution to estimate the certainty at a selected confidence interval (e.g., 99%). This confidence interval is then displayed graphically on a scatter plot displaying various linear combinations of the original model and the correction model, which allows a user to select a model with statistically equivalent performance as the original model.

In some implementations, metadata related to alternative models generated by a method are stored in a knowledge graph, including values of λ and corresponding fairness and accuracy metrics for each model variation, as described in U.S. patent application Ser. No. 16/394,651, the contents of which are incorporated herein by reference in their entirety. The selected fair alternative is analyzed using Shapley value decomposition techniques in order to record the importance of each predictive variable in the corrected model, as described in U.S. patent application Ser. No. 16/434,731, the contents of which are incorporated herein by reference in their entirety. In examples, the factors driving differences in approval rate between protected and unprotected borrowers are documented. A method can include recording approval rate, predictive accuracy, default risk, and business metrics such as gross profit and loss, disaggregated by protected status, for each model variation. In implementations, these metadata are then combined with documentation templates and used to generate a written compliance report of a form similar to Exhibit A. In some implementations, documentation is generated using a procedure similar to the one described in U.S. patent application Ser. No. 16/394,651.

In some implementations, a method includes receiving data, model scores and outcomes associated with a pre-existing model (e.g., credit reports, protected status flags, repayment flags, among others), learning a correction model, and automatically selecting an optimal value for λ based on a search procedure. The search procedure can include establishing a stopping criterion. In some implementations, the stopping criterion is based on a 95% confidence interval in AUC for a pre-existing model. In some implementations, a confidence interval is computed using provided scores and outcomes and a bootstrap sampling method.

In some implementations, confidence is a tunable parameter provided in a configuration file, or database, or by an end user via a graphical user interface. In this way the system computes an optimal value for λ based on the specified confidence interval in AUC from the provided model, e.g., 95%, 99%, 99.9%. In some implementations, a confidence interval is provided as an input, either by an end user via a graphical user interface, or via a configuration file or database. The stopping criterion can then be given by the AUC for the pre-existing model minus ½ the width of the confidence interval, which establishes the minimum AUC that would be accepted. In some implementations, the automated search proceeds by setting λ to ½ and performing binary search on the interval [0,1] until a value $\lambda_{fairest}$ is found that maximizes the predetermined fairness metric while still achieving an AUC greater than the minimum acceptable AUC. The less discriminatory alternative model selected is the linear combination of models based on $\lambda_{fairest}$.

In some implementations, scores generated by a linear combination of models are odds-aligned with another existing credit scoring model such as a FICO® or Vantage® score such that the range of scores is between 300-800 and the likelihood of default associated with a given numeric value of the score provided by the corrected model is similar to the likelihood associated a FICO® score of that range. In some implementations, odds alignment or calibration is accomplished by fitting a model on the scatter plot of observed average odds within predetermined intervals of the range of scores of the fairness corrected model and the credit score such as FICO®. In this way, a corrected model, such as the corrected model 106, can be made to have the same "meaning" as a standard credit score, which makes it more intuitive to use by underwriters familiar with a standard credit score or other downstream processes, such as automated downstream processes that auto-approve or auto-deny a loan application.

In some implementations, a fair correction and odds alignment process is applied to an automatically-generated model, e.g., based on methods described in U.S. patent application Ser. No. 10/104,616, the contents of which are incorporated herein by reference in their entirety. In some implementations, a fair correction and odds alignment process is applied to an automatically-generated model based on the sampling process described in U.S. Patent Application No. 63/364,089, the contents of which are incorporated herein by reference in their entirety.

In some implementations, after a fairness correction model is generated and the fair alternative model is selected, adverse action reason code generators are configured and combined with the model scoring function as described in U.S. Patent Application No. 63/046,977, the contents of which are incorporated herein by reference in their entirety. In some implementations, model monitors are generated that determine whether the input distributions match the model development data, and whether the scores being generated by the model match the distribution observed during model development as described in U.S. patent application Ser. No. 10/104,616.

In some implementations, the corrected model and adverse action reason code generators are deployed as a web service that is accessed over the internet by a loan origination system that makes lending decisions based on the score, e.g., as described in U.S. patent application Ser. Nos. 16/394,651 and 17/104,616, the contents of which are incorporated herein by reference in their entirety. In some implementations, a loan origination system (LOS) receives a loan application, usually from a website where a consumer has entered their personal information and applied for a loan. The LOS can retrieve credit reports from various credit reporting agencies, and call a deployed web service hosting a fair model to retrieve a risk score and reason codes associated with that applicant.

In some implementations, a LOS first authorizes using a method such as JSON Web Tokens (JWT), in which a password is sent first to an authorization service, which responds with a key that can be used to access a scoring service for a limited amount of time (e.g., 5 minutes). The LOS then sends loan application data, credit reports, among others, to a scoring web service over the Internet or other network, and receives a score and reason codes in response, or an error message, e.g., if the request is not able to be scored.

Transmission of sensitive data can be secured using Transport Layer Security (TLS) or other transmission layer security. If the score exceeds a predetermined threshold, the loan application can be approved and if the score is below a predetermined threshold, the loan application can be denied. In some implementations, if the score otherwise satisfies a threshold, the loan application can be approved. In some implementations, if an application is neither auto-approved or auto-denied, it can be routed to underwriters for further processing. In this case, the score and reason codes can be displayed via a user interface so that an underwriter can consider them as they work with the applicant and determine whether they should be approved.

In some implementations, when the loan is approved the approved loan amount is deposited into the applicant's bank account, or a credit card is mailed to the applicant's postal address. In some implementations, when the loan is denied, an adverse action notice is generated based on the reason codes provided in the scoring service using a template similar to those provided in Appendix C to 12 CFR Part 1002 (Regulation B) (See Appendix C to 12 CFR Part 1002 (Regulation B) at the CFPB website: https://www.consumerfinance.gov/rules-policy/regulations/1002/c/); the notice is then printed and mailed to the applicant at the provided postal address. In this way, the corrected model may be used to grant or deny access to credit while still complying with United States consumer finance regulation.

It will be appreciated by those with skill in the art that correction methods disclosed can be used to correct models for bias with respect to attributes other than sensitive attributes. In some implementations, an original model is an underwriting model and a correction model is trained to equalize a distribution of scores between segments of customers, e.g., customers solicited via various marketing campaigns or low-income vs high-income customers. In some implementations, segments to be equalized are based on properties of a product, e.g., location of a property securing a mortgage loan, or demographics of the geographic region in which a property is located. In some implementations, an original model is a search results ranking model, which is "corrected" to create more personalized search results for a given user. The correction in this case can include re-ranking search results in a way that causes a distribution in observed responses for a given user (e.g., clicks on search results) to better match an order predicted by an original, unpersonalized ranking model. In this way correction methods described herein may be used to personalize a pre-existing model.

Methods disclosed herein can include mechanisms to correct predictive models so that the distribution of scores or errors is more equalized with respect to a given attribute or collection of attributes. The problem of equalizing outcomes for models is rooted in predictive modeling, a problem that arises only in the context of computer-based predictive models, including machine learning models.

In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device. In some implementations, data transmitted to the user includes charts such as those displayed in FIG. 4A, and data received at the server includes the model selected by the user for use in production.

Figure 4A:
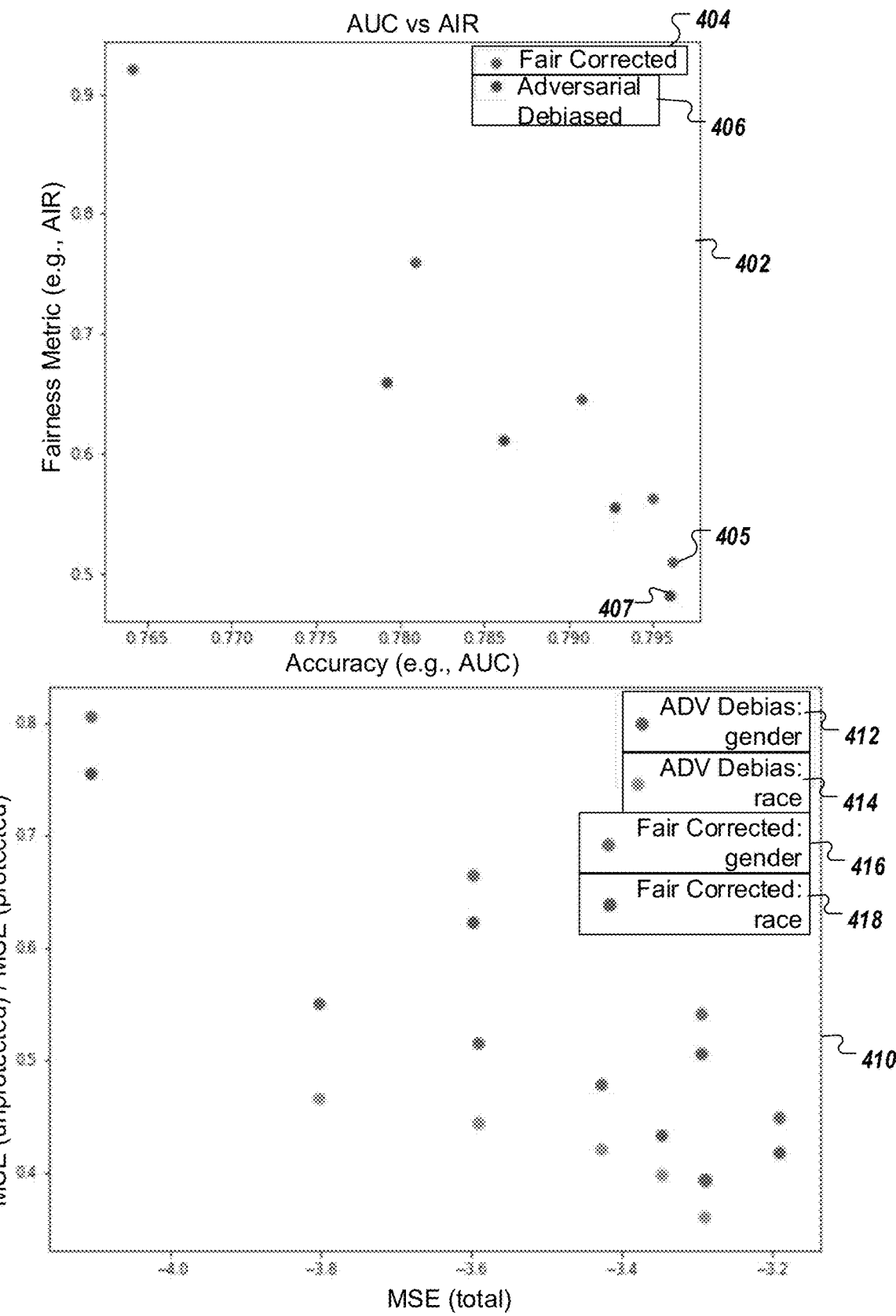
FIG. 4A is a diagram showing an example comparison of output from a first model with output from a corrected model.

FIG. 4A is a diagram showing an example comparison of output from a first model with output from a corrected model. Data points in plot 402 show adversarial debiasing methods, e.g., adversarial debiased 406, are less accurate than corrected models, e.g., fair corrected 404. FIG. 1 shows an example fair corrected model where the model 104 is corrected by the correction model 106. Adversarially debiased methods can include training an adversarial network to determine if a first model is making decisions that are correlated with specific features of a dataset (e.g., making loan decisions that have a disparate impact on black persons). The adversarial method, in general, is less efficient in that it includes retraining the first model based on output from an adversarial model. With the corrected model approach, the first model can be consistent while a correction model is trained to correct its output.

In some implementations, fair corrected models, such as the model 104 and the correction model 106 of FIG. 1, can generate more fair underwriting models than adversarial debiasing while maintaining greater accuracy. For example, as shown in FIG. 4A, for a given accuracy or area under curve (AUC), adversarial debiasing model corresponding to the datapoint labeled 407 has a significantly lower fairness metric or AIR than the fair corrected model corresponding to the datapoint labeled 405.

Models generating the data shown in FIG. 4A can be configured to provide a probability of default classification for consumer loans. Initial data, e.g., the input features 102, can include a national sample of credit data with BISG labels. The initial data can include one or more records, e.g., 875,000 records.

In some implementations, computation runtime for fair corrected models is less than adversarial debiasing. For example, for a standard computation architecture, adversarial debiasing can take 3 hours of processing time where each model in a debiased model can take approximately 1 hour. For the standard computation architecture, corrected models (e.g., as shown in FIG. 1) can take 0.1 hours of processing time. Corrected models can include one or more trees. For example, corrected models can include regressors, such as Xgboost regressors, with one or more (e.g., 300) trees. The corrected models can be explained and fully transparent, e.g., as described in U.S. Pat. No. 10,977,729, and U.S. Patent Application No. 63/117,696 both of which are incorporated herein by reference.

In contrast with a prior method of creating fairer models, adversarial debiasing (ref. U.S. Pat. No. 10,977,729, the contents of which are incorporated herein by reference in their entirety), the presently disclosed method has the advantage of being significantly more computationally efficient. In adversarial debiasing, a new model is estimated based on each selection of fairness penalty λ. In practice, it is often desirable to explore 10-20 different values of λ, sometimes more, in order to determine the best model to select in light of fairness and accuracy metrics. Model estimation (also called fitting or training) is a computationally expensive task, sometimes requiring hours or days, depending on the size of the dataset and the hardware used to estimate the model. For example, one machine learning underwriting model for a regional bank took 10-15 hours to estimate on a 80 core 3 GHz machine. Estimating 10 fair alternative models therefore took 100-150 hours. In contrast with adversarial debiasing, the fair correction model $\delta(X)$ is estimated once, and all that is required to evaluate different values of λ is to compute different linear combinations of model outputs. Therefore as the number of fair models increases, the computational cost of the fair correction approach is linear in the product of the number of different values of λ and the size of the test set used to evaluate the model. Estimating a fair XGBoost model, on the other hand, is linear in the product of the number of different values of λ and the size of the test, the number of trees, the depth of trees and the logarithm of the number of training data rows. This results in significantly longer runtimes for adversarial debiasing, which can limit the number of different values of λ that can be practically explored.

Figure 4B:
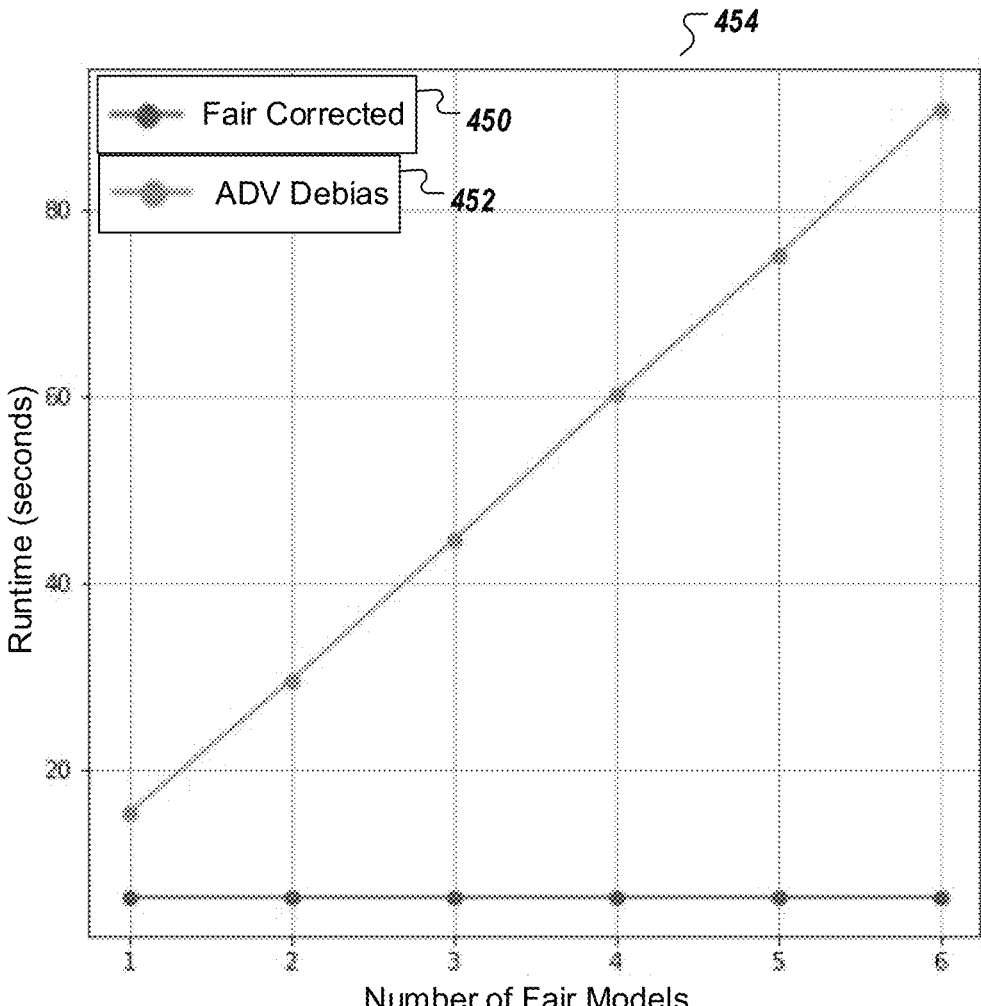
FIG. 4B is a diagram showing an example timing comparison of two approaches

Results of a timing experiment comparing the two approaches are displayed in FIG. 4B. The experiment was run based on models trained using the Census Income dataset (see UCI Machine Learning Data Repository for a detailed description of the dataset: https://archive.ics.uc-i.edu/ml/datasets/census+income). Fair XGBoost models, otherwise referred to as fair correct, corrected models, or models that produce more fair results, were trained to predict low household income. The adversarial debiasing, referred to as ADV Debias, method used the method described in U.S. Patent Application No. 63/117,696. The Fair XGBoost model training method includes training a primary XGBoost model and at least one secondary protected attribute esti-mator simultaneously, such that the primary XGBoost mod-el's gradient and Hessian calculations are modified to incor-porate the loss from the at least one secondary race estimation model. The fair corrected method, as shown with the line corresponding to "Fair Corrected" corresponds to methods described herein. Values for λ, representing a fairness penalty, were 0.3, 0.5, 0.6, 0.7, and 0.8. Runtime was measured on a 30 core, 3.1 GHz Linux host.

FIG. 4B shows a comparison of two approaches for generating more fair models and results. The chart 454 of FIG. 4B shows runtime in seconds on the y axis and the number of fair models generated (corresponding to different values of λ, e.g., models that weight fairness versus "accu-racy" determined by the model differently) evaluated based on Fair Corrected 450 and Adversarial Debiasing 452.

As shown in FIG. 4B, computing 1 alternative model using the fair correction method took approximately 2.5 seconds, whereas computing 1 alternative model using adversarial debiasing took 12.5 seconds. For 5 alternative models the fair correction method completed in 2.5 seconds, while adversarial debiasing took 75 seconds. This substan-tial improvement in compute time enables users, such as data scientists, civilians, companies, among others, to explore more alternative models in the same amount of time, it also allows model estimation to be completed more quickly, using less energy and with less cost. For services built using a large number, e.g., hundreds or thousands, of models that must be refreshed periodically, the increase in efficiency and decrease in cost is significant. High through-put computing often requires sufficient allocation of com-pute capacity to perform a required task at a required interval. If models were to be updated quarterly, monthly, weekly, daily or hourly, the compute capacity required to perform adversarial debiasing would cost too much to be practical. Fair correction makes it practical to conduct less discriminatory alternative model searches more efficiently and more frequently.

Referring to FIG. 4A, chart 410 shows, using mean squared error data, the corrected models outperforming alternative adversarial (ADV) debiased models. The chart 410 shows separate data for separate models generated using the methods for ADV debiasing and correction modeling.

Both techniques are used to generate a model for each of gender and race. In the context of lending, both the ADV and correction models help to ensure that the given model output indicating loan decisions or terms have less of a disparate impact on one sex or another or one race or another.

Data in the chart 410 is generated for a task of predicting household income. An initial dataset used to generate output from the models can include income data from a census. The data can include gender or race labels. The data can include any number of records, e.g., 32,561 records. Corrected models, for both race and gender, have lower error rates (MSE total closer to 0) and higher demographic parity (MSE for unprotected over MSE for protected is closer to 1) than Adversarial Debiasing.

In some implementations, a correction model is trained to match error distribution instead of score distributions. As described in FIG. 1, the system 100 can train the correction model 106 to generate corrections for the model 104 using differences in score values. In some implementations, the score correction engine 108 provides error distribution data to the correction model 106 as ground truth data. The system 100 can train the correction model 106 using the error distribution data such that a combination of output from the correction model 106 and the model 104 for protected versus unprotected (or other subgroup pairings) results in an error distribution that is more equal between two or more groups than other models or algorithms.

Figure 5:
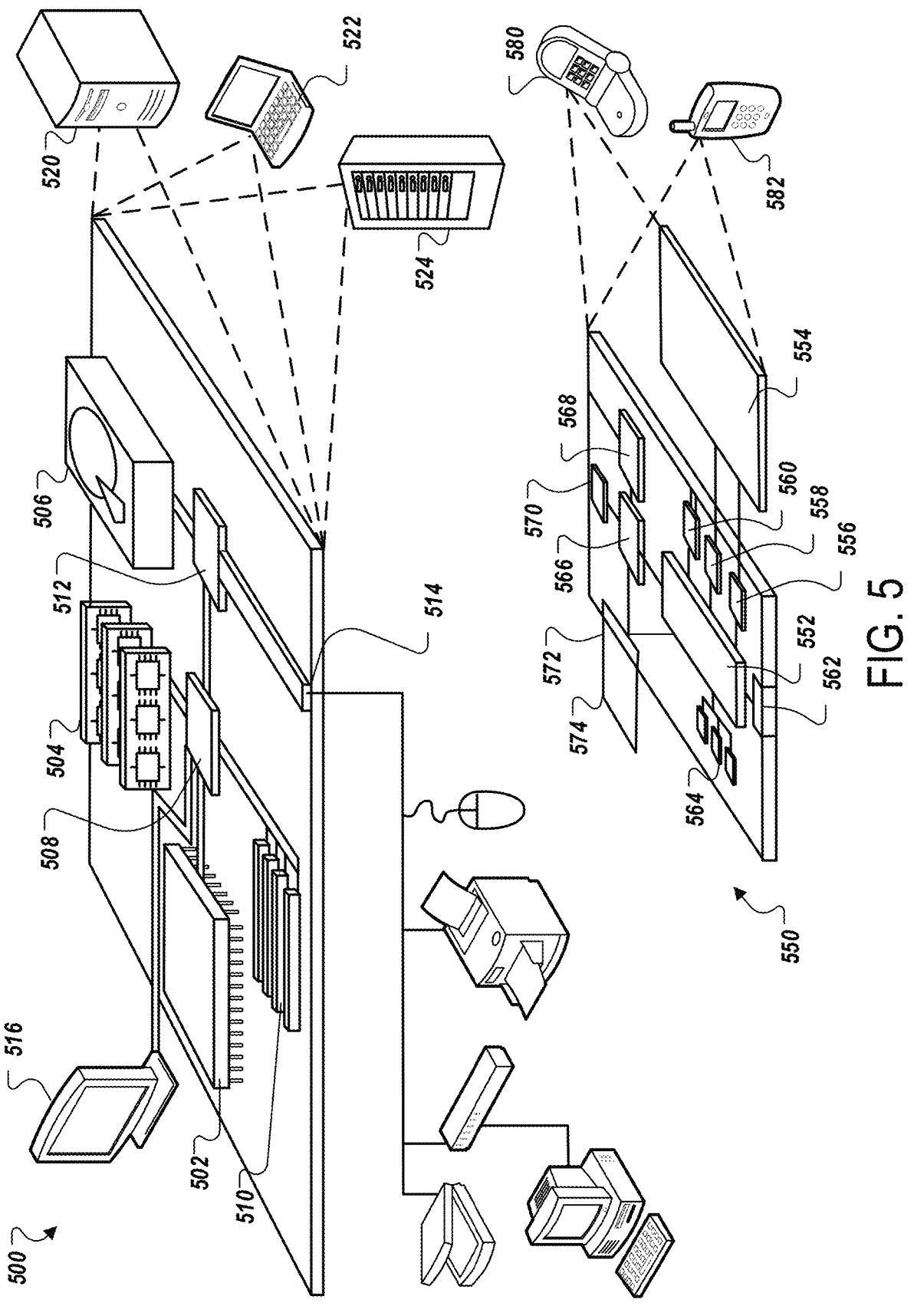
FIG. 5 is a diagram illustrating an example of a computing system used for machine learning model correction.

FIG. 5 is a diagram illustrating an example of a computing system used for machine learning model correction.

The computing system includes computing device 500 and a mobile computing device 550 that can be used to implement the techniques described herein. In some imple-mentations, the computing system implements one or more methods described herein. The computing device 500 or the mobile computing device 550 described here can perform operations to implement the model 104, the correction model 106, training of the models, generation of training data for the models, providing data to users, among others.

The computing device 500 is intended to represent vari-ous forms of digital computers, such as laptops, desktops, workstations, personal digital assistants, servers, blade serv-ers, mainframes, and other appropriate computers. The mobile computing device 550 is intended to represent vari-ous forms of mobile devices, such as personal digital assis-tants, cellular telephones, smart-phones, mobile embedded radio systems, radio diagnostic computing devices, and other similar computing devices. The components shown here, their connections and relationships, and their func-tions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 con-necting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 502 is a single threaded processor. In some implementations, the processor 502 is a multi-threaded processor. In some implementations, the processor 502 is a quantum computer.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine readable mediums (for example, the memory 504, the storage device 506, or memory on the processor 502). The high-speed interface 508 manages bandwidth-intensive operations for the computing device 500, while the low-speed interface 512 manages lower bandwidth-intensive operations. Such allocation of functions is an example only. In some implementations, the high speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may include one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry in some cases. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 568 using a radio frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, among others) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program can include microprocessors, microcontrollers, FPGAs, ASICs, and any one or more processors of any kind of digital computer. A processor will receive instructions and data from a read only memory or a random access memory or both. The essential elements of a computer are a processor for performing instructions and one or more memory devices for storing instructions and data. A computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computationally efficient method for correcting and improving predictive machine learning models for which one or more attributes are prohibited as model inputs, the method implemented by a computer system and comprising:

until a stopping criterion is reached, iteratively:

applying an ensemble model comprising a trained original machine learning (ML) model to first input data associated with subgroups to generate scores for each row in the first input data;

generating, based on the scores and initial training data representing training data used to train the original ML model, correction training data that comprises one or more difference values for the subgroups, wherein each of the difference values represents a difference in the scores between at least two of the subgroups;

training, based on the correction training data, a predictive correction ML regression model, wherein the correction training data includes corrections to make the scores between the subgroups more similar; and

incorporating the predictive correction ML regression model in the model ensemble;

deploying the model ensemble as a scoring web service hosted by the computer system;

receiving, by the scoring web service, from an external system, and via one or more networks, second input data;

applying the model ensemble to the second input data to generate a score; and returning the score via the networks to the external system in response to the second input data, wherein the score is fairer and more accurate than the scores generated by the original ML model with respect to the one or more attributes prohibited as model inputs.

2. The method of claim 1, wherein the predictive correction ML regression model comprises a plurality of regressors each with a plurality of trees.

3. The method of claim 1, wherein the input data comprises the initial training data and includes data from a census income dataset.

4. The method of claim 1, wherein the predictive correction ML regression model comprises a linear regression model, neural network, deep neural network, random forest, extra tree forest, radial basis function, XGBoost regressor, CatBoost regressor, TabNet regressor, decision tree regressor, or combinations thereof.

5. The method of claim 1, further comprising:

identifying the subgroups using a Bayesian Improved Surname Geocoding method BISG), Zest Race Predictor method (ZRP), or combination thereof;

grouping the scores using the subgroups; and determining one or more differences in the scores for the subgroups.

6. The method of claim 1, wherein the subgroups comprise race, ethnicity, religious beliefs, or a combination thereof.

7. A non-transitory computer-readable medium for computationally efficient correction and improvement of predictive machine learning models for which one or more attributes are prohibited as model inputs and storing instructions executable by a computer system to:

until a stopping criterion is reached, iteratively:

apply an ensemble model comprising a trained original machine learning (ML) model to first input data associated with subgroups to generate scores for each row in the first input data;

generate, based on the scores and training data used to train the original ML model, correction training data that comprises one or more difference values for the subgroups, wherein each of the difference values represents a difference in the scores between at least two of the subgroups;

train, based on the correction training data, a predictive correction ML regression model, wherein the correction training data includes corrections to make the scores between the subgroups more similar; and incorporate the predictive correction ML regression model in the model ensemble;

deploy the model ensemble as a scoring web service hosted by the computer system;

receive, by the scoring web service, from an external system, and via one or more networks, second input data;

apply the model ensemble to the second input data to generate a score; and return the score via the networks to the external system in response to the second input data, wherein the score is fairer and more accurate than the scores generated by the original ML model with respect to the one or more attributes prohibited as model inputs.

8. A computer system, comprising:

one or more processors; and memory coupled to the one or more processors and storing instructions for computationally efficient correction and improvement of predictive machine learning models for which one or more attributes are prohibited as model inputs that, when executed by the processors, cause the computer system to:

until a stopping criterion is reached, iteratively:

apply an ensemble model comprising a trained original machine learning (ML) model to first input data associated with subgroups to generate scores for each row in the first input data;

generate, based on the scores and training data used to train the original ML model, correction training data that comprises one or more difference values for the subgroups, wherein each of the difference values represents a difference in the scores between at least two of the subgroups;

train, based on the correction training data, a predictive correction ML regression model, wherein the correction training data includes corrections to make the scores between the subgroups more similar; and incorporate the predictive correction ML regression model in the model ensemble;

deploy the model ensemble as a scoring web service hosted by the computer system;

receive, by the scoring web service, from an external system, and via one or more networks, second input data;

apply the model ensemble to the second input data to generate a score; and return the score via the networks to the external system in response to the second input data, wherein the score is fairer and more accurate than the scores generated by the original ML model with respect to the one or more attributes prohibited as model inputs.

9. The computer system of claim 8, wherein the instructions, when executed by the processors, further cause the computer system to:

identify the subgroups using a Bayesian Improved Surname Geocoding method (BISG) or a Zest Race Predictor method (ZRP);

group the scores using the subgroups; and determine one or more differences in the scores for the subgroups.

10. The computer system of claim 8, wherein the input data comprises the initial training data and includes data from a census income dataset.

11. The computer system of claim 8, wherein the predictive correction ML regression model comprises a plurality of regressors each with a plurality of trees.

12. The computer system of claim 8, wherein the predictive correction ML regression model comprises a linear regression model, neural network, deep neural network, random forest, extra tree forest, radial basis function, XGBoost regressor, CatBoost regressor, TabNet regressor, decision tree regressor, or combinations thereof.

13. The computer system of claim 8, wherein the subgroups comprise race, ethnicity, religious beliefs, or a combination thereof.

14. The non-transitory computer-readable medium of claim 7, wherein the predictive correction ML regression model comprises a plurality of regressors each with a plurality of trees.

15. The non-transitory computer-readable medium of claim 7, wherein the input data comprises the initial training data and includes data from a census income dataset.

16. The non-transitory computer-readable medium of claim 7, wherein the predictive correction ML regression model comprises a linear regression model, neural network, deep neural network, random forest, extra tree forest, radial basis function, XGBoost regressor, CatBoost regressor, Tab-Net regressor, decision tree regressor, or combinations thereof.

17. The non-transitory computer-readable medium of claim 7, wherein the instructions are further executable by the computer system to:

identify the subgroups using a Bayesian Improved Surname Geocoding method (BISG) or a Zest Race Predictor method (ZRP);

group the scores using the subgroups; and determine one or more differences in the scores for the subgroups.

18. The non-transitory computer-readable medium of claim 7, wherein the subgroups comprise race, ethnicity, religious beliefs, or a combination thereof.

19. The method of claim 1, wherein the model ensemble at least partially corrects for bias or inaccuracy in the original ML model, the model ensemble has a computational cost that is linear in a product of a number of different values of a fairness penalty and a size of a test set used to evaluate the model ensemble, and the fairness penalty controls an extent to which a fairness correction is applied to the original ML model.

20. The computer system of claim 8, wherein the model ensemble at least partially corrects for bias or inaccuracy in the original ML model, the model ensemble has a computational cost that is linear in a product of a number of different values of a fairness penalty and a size of a test set used to evaluate the model ensemble, and the fairness penalty controls an extent to which a fairness correction is applied to the original ML model.

21. The non-transitory computer-readable medium of claim 7, wherein the model ensemble at least partially corrects for bias or inaccuracy in the original ML model, the model ensemble has a computational cost that is linear in a product of a number of different values of a fairness penalty and a size of a test set used to evaluate the model ensemble, and the fairness penalty controls an extent to which a fairness correction is applied to the original ML model.

* * * * *